ated Apr. 30, 1968

3,380,840
CERTAIN MODIFIED POLYESTERAMIDES AND THE USE THEREOF AS ADHESIVES
Stuart A. Harrison, Minneapolis, Minn., assignor to General Mills, Inc., a corporation of Delaware
No Drawing. Filed Jan. 6, 1966, Ser. No. 519,018
12 Claims. (Cl. 106—243)

This invention relates to certain modified polyesteramides. More particularly, it relates to polyisocyanate or polyisothiocyanate modified polyesteramides, the latter being prepared from the polymeric fat acids and certain alkanolamines. The invention also relates to the use of such modified polyester amides as adhesives and to the resulting adhesively bonded articles.

It has been recently discovered that polyesteramides prepared from polymeric fat acids and certain alkanolamines were good adhesives for a variety of substrates. While such polyesteramides were found to yield bonds between substrate surfaces which were quite strong, such bonds were found to have a tendency to fail by adhesive failure when pulled rapidly. This latter failure is sometimes referred to as unzipping.

I have now discovered that the polytesteramides prepared from polymeric fat acids and certain alkanolamines can be modified by reaction with polyisocyanates or polyisothiocyanates to yield higher molecular weight products which have increased adhesive properties. In addition to being improved in adhesive strength, surfaces bonded with such modified polyesteramides were generally also found to have no tendency to unzip or a substantially reduced tendency to unzip when pulled rapidly.

Therefore, it is an object of the present invention to provide new modified polyesteramides. A further object of my invention is to provide new polyisocyanate or polyisothiocyanate modified polyesteramides prepared from polymeric fat acids and certain alkanolamines. Another object of the invention is to provide a method of bonding substrate surfaces using such modified polyesteramides. A still further object of the present invention is to provide articles wherein the surfaces of at least two substrates are bonded by such modified polyesteramides. These and other objects will become apparent from the following detailed description of the invention.

The polyesteramides are prepared from polymeric fat acids and certain alkanolamines. A wide variety of polymeric fat acids can be used to prepare the polyesteramides. Relatively pure dimeric fat acids can be distilled from commercially available polymeric fat acid mixtures. The term "polymeric fat acid" refers to a polymerized fat acid. The term "fat acid" as used herein refers to naturally occurring and synthetic monobasic aliphatic carboxylic acids having hydrocarbon chains of 8–24 carbon atoms. The term "fat acids," therefore, includes saturated, ethylenically unsaturated and acetylenically unsaturated acids. These acids are generally polymerized by somewhat different techniques, but because of the functional similarity of the polymerization products, they are generally referred to as "polymeric fat acids." The polymeric fat acids usually contain a predominant portion of dimerized fat acids, a small quantity of trimerized and higher polymeric fat acids and some residual monomers.

Saturated fat acids are difficult to polymerize, but polymerization can be obtained at elevated temperatures with a peroxidic catalyst such as di-t-butyl peroxide. Because of the low yields of polymeric products, these materials are not commercially significant. Suitable saturated fat acids include branched and straight chain acids such as caprylic, pelargonic, capric, lauric, myristic, palmitic, isopalmitic, stearic, arachidic, behenic and lignoceric.

The ethylenically unsaturated fat acids are much more readily polymerized. Catalytic or non-catalytic polymerization techniques can be employed. The non-catalytic polymerization generally requires a higher temperature. Suitable catalysts for the polymerization include acid or alkaline clays, di-t-butyl peroxide, boron trifluoride, and other Lewis acids, anthraquinone, sulfur dioxide and the like. Suitable monomers include branched and straight chain, mono- and polyethylenically unsaturated acids such as 3-octenoic, 11-dodecenoic, linderic, lauroleic myristoleic, tsuzuic, palmitoleic, petroselinic, oleic, elaidic, vaccenic, gadoleic, cetoleic, nervonic, linoleic, linolenic, eleostearic, hiragonic, moroctic, timnodonic, eicosatetraenoic, nisinic, scoliodonic, and chaulmoogric.

The acetylenically unsaturated fat acids can be polymerized by simply heating the acids. Polymerization of these highly reactive materials will occur in the absence of a catalyst. The acetylenically unsaturated acids occur only rarely in nature and are expensive to synthesize. Therefore, they are not currently of commercial significance. Any acetylenically unsaturated fat acid, both straight chain and branched chain, both mono- and polyunsaturated, are useful monomers for the preparation of the polymeric fat acids. Suitable examples of such materials include 10-undecynoic acid, tariric acid, stearolic acid, behenolic acid and isamic acid.

Although any one of the above-described saturated, ethylenically unsaturated and acetylenically unsaturated fat acids may be used to prepare the polymeric fat acids, it is generally the practice in the art to polymerize mixtures of acids (or the simple aliphatic alcohol esters, i.e., the methyl esters) derived from the naturally occurring drying and semi-drying oils. Suitable drying or semi-drying oils include soybean, linseed, tall, tung, perilla, oiticia, cottonseed, corn, sunflowers, safflower, dehydrated castor oil and the like. Also, the most readily available naturally occurring polyunsaturated acid available in large quantities is linoleic acid. Accordingly, it should be appreciated that polymeric fat acids will, as a practical matter, result from fatty acid mixtures that contain a substantial proportion of linoleic acid and will thus generally be composed largely of polymerized linoleic acid. Preferably, the polyesteramides are prepared from polymeric fat acids which have a dimeric fat acid content of at least 70%. It is particularly preferred to use polymeric fat acids which contain 85–100% dimeric fat acids. The polymeric fat acids may also be partially or completely hydrogenated.

The alkanolamine used to prepare the polyesteramides is selected from the group consisting of monoethanolamine, 3-aminopropanol-1 or mixtures thereof.

The polyesteramides are prepared by reacting about equivalent amounts of the alkanolamine and the polymeric fat acids. The reaction is preferably conducted at temperatures in the range of about 130° to 400° C. for about 1 to 15 hours, and preferably for about 1 to 4 hours. It is understood that higher temperatures can be used but care must be taken in the use thereof to avoid excessive cross-linking and/or degradation of the polyesteramide product. The reaction can be conducted at atmospheric pressure, at slight pressures or under vacuum. The reaction conditions are selected in such a manner as to facilitate removal of water which is given off during the formation of the polyesteramide. Conventional antioxidants may be added to the reaction mixture and the reaction may be conducted under an inert gas such as nitrogen. Also, in some instances it may be desirable to use a small excess of either the alkanolamine or polymeric fat acid to prepare a first product and then add more of the polymeric fat acid or the alkanolamine to complete the reaction.

The described polyesteramides are modified according to my invention by reacting the same with polyisocyanates or polyisothiocyanates. A wide variety of these organic reactants may be used. Representative of the useful polyisocyanates are: methylene bis-(4-phenyl isocyanate), toluene - 2,4 - diisocyanate, toluene-2,6-diisocyanate, 1,5-naphthalene diisocyanate, p-phenylene diisocyanate, 1,5-naphthalene diisocyanate, p-phenylene diisocyanate, 3,3'-dimethyl-4,4'-diphenylmethane diisocyanate, 4,4'-diphenyl-isopropylidine diisocyanate, 3,3'-dimethyl-4,4'-diphenyl diisocyanate, hexamethylene diisocyanate, dodecamethylene diisocyanate, ethylene diisocyanate, butylene diisocyanate, propylene-1,2-diisocyanate, heptylidene diisocyanate, cyclopentylene-1,3-diisocyanate, cyclohexylene-1,4-diisocyanate, and the like. The polyisothiocyanates corresponding to the above compounds can also be employed. One preferred polyisocyanate is derived from polymeric fat acids and has the following idealized, structural formula:

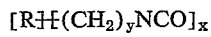

where $y$ is 0 or 1, $x$ is an integer of 2 to about 4 and R is the hydrocarbon group of polymeric fat acids. The polymeric fat acid starting materials are prepared by polymerizing fat acids (saturated, ethylenically unsaturated, or acetylenically unsaturated) of 8 to 24 carbon atoms. Such polymeric fat acids are described above. The polyisocyanates of the above formula where $y$ is 0 are prepared by converting the polymeric fat acids to the corresponding polymeric acid chlorides, reacting the acid chlorides with a metal azide to form the polymeric acyl azides and then heating the acyl azides to produce the polyisocyanates. The polyisocyanates of the above formula wherein $y$ is 1 are prepared by converting the polymeric fat acids to the corresponding polynitriles and then hydrogenating the polynitriles in the presence of ammonia and a catalyst such as Raney nickel to form polyamines. The polyamines are then reacted with phosgene to give the corresponding carbamyl chlorides which are decomposed to yield the polyisocyanates. The various polyisocyanates and polyisothiocyanates preferably contain from 2 to about 50 carbon atoms. It is also preferred to employ diisocyanates or diisothiocyanates. Mixtures of the described reactants may also be used.

The organic polyisocyanate or polyisothiocyanate is used in an amount sufficient to substantially increase the molecular weight and adhesive properties of the polyesteramide. Generally, the polyisocyanate or polyisothiocyanate will be used in an amount of about 0.5 to 50% by weight and preferably 1.0 to 25% by weight of the polyesteramide. The polyesteramide can first be heated and then the polyisocyanate or polyisothiocyanate added thereto. Or the said reactants can simply be admixed and then heated to effect the modification. Where desired, the modification reaction can be carried out in the presence of solvents such as toluene. Also, the reactants can be admixed in the presence or absence of solvent, applied to the surface or surfaces to be bonded and then heated to effect the modification. Temperatures of about 120 to 250° C. can be used for the reaction of the polyisocyanate or polyisothiocyanate and the polyesteramide. The reaction time depends somewhat on the particular polyesteramide and the amount of isocyanate employed and thus varies such as from a few minutes to several hours. Reaction times of about 5 minutes to 5 hours are preferred.

As indicated above, the new modified polyesteramides of the present invention are particularly useful as adhesives. They are excellent adhesives for polyethylene, polypropylene and Mylar (a polyester resin prepared from terephthalic acid and ethylene glycol, available from E. I. du Pont de Nemours and Company). The surfaces of these materials are essentially non-reactive even when treated, i.e., flame treatment or electric discharge treatment. Thus, for example, there is no appreciable amount of active hydrogen on the surfaces, the same being required for reaction with cyanato groups. The modified polyesteramides may also be used for combining a wide variety of other substrate surfaces and solid materials such as paper, glass, cellophane, aluminum foil, cellulose acetate films, glassine, metal sheets, numerous other synthetic polymeric substances, fabrics, wool and the like. The materials bonded may be the same or different and the polyesteramide may be applied to a portion of a surface of such solid materials or to a complete surface thereof. The modified polyesteramides are applied to such materials by conventional procedures. Thus the adhesives may be used in hot-melt form, in emulsion form or in solution form. The adhesive or solution thereof can be applied by brushing, spraying, roller coating, knife coating or other mechanical means. Suitable solvents include alcohols, aliphatic and aromatic hydrocarbons, chlorinated hydrocarbons, ethyl acetate and the like. Illustrative of such solvents are isopropanol, butanol, benzene, toluene, Skellysolve B, and carbon tetrachloride. The concentration of the modified polyesteramide in the solvent is not critical, but is generally in the range of about 5 to 75% by weight and preferably in the range of about 15 to 50% by weight based on the total compositions. Pigments, fillers and other known addition agents may also be admixed with the modified polyesteramides where desired.

The following examples are given by way of illustration and not in limitation.

EXAMPLE I

Part A.—Control

A mixture of 422 g. hydrogenated polymeric fat acids (dimeric fat acid content—97.8%) and 48.6 g. monoethanolamine were heated in a one liter, one-necked flask with a thermometer well. The flask had a 10″ Vigreaux column with a take-off to remove water and other volatiles and the hot materials were mixed continuously by mechanically swirling the reaction flask. The reactants were heated to 240° C. over a three hour period during which time 22.5 g. of water and other volatiles were collected. Heating was then continued under water pump vacuum for an additional hour at 400° C. and the product allowed to cool under vacuum. The resulting polyesteramide had the following properties:

| | |
|---|---|
| Acid No. | 1.5 |
| Hydroxyl No. | 12.8 |
| Gardner viscosity (50% by weight solution in toluene) | V–W |

The polymeric fat acids used in this example were prepared by polymerizing the mixture of acids derived from tall oil. The resulting mixture of polymerized acids consisted mainly of polymerized oleic acid and polymerized linoleic acid. The said polymerized mixture was hydrogenated and distilled to provide the starting material having the designated amount of dimeric fat acids.

Part B.—Modification 1

Fifty grams of the polyesteramide prepared in Part A were mixed with 0.75 g. of toluene diisocyanate (mixture of about 80% 2,4- and 60% 2,6-toluene diisocyanate) and heated to 150° C. for three hours. A 50% by weight solution of the resulting modified polyesteramide in toluene was prepared, said solution having a Gardner viscosity of $Z_1$.

Part C.—Modification 2

Part B was repeated except that 1.1 g. methylene bis-(4-phenyl isocyanate) was used in place of the toluene diisocyanate. The resulting toluene solution of the modified polyesteramide had a Gardner viscosity of $Z_5$–$Z_6$.

Part D.—Comparison of adhesive properties

Solutions of the Control, Modification 1 and Modification 2 (50% by weight in toluene) as prepared in Parts A–C were used to adhesively bond films of treated, low density polyethylene (3 mil thickness), treated polypropylene (2 mil thickness) and Mylar (1 mil thickness). The solutions were spread at a thickness of about 1.5 mil on one inch wide strips of the polyethylene, polypropylene and Mylar with a doctor blade. The strips were allowed to dry overnight to give .75 mil dry films of the polyesteramide and the modified polyesteramides on the substrate surfaces. A second strip to the surface film was then bonded to the strips having the adhesive coatings. The peel strength was measured by pulling the bonded films apart at right angles at a rate of 2 inches per minute and the maximum strength in grams per inch was recorded. Results are set forth in the following Table 1.

TABLE 1

| Adhesive | Peel Strength (g./in.) Substrate | | |
|---|---|---|---|
| | Polyethylene | Polypropylene | Mylar |
| Control | 154 | 200 | 177 |
| Modification 1 | 1,040 | 1,090 | 1,270 |
| Do | | | 2,225[1] |
| Modification 2 | 1,180 | | |

[1] Bonded substrates heated for five minutes at 150° C. No heating in other tests.

In addition to a vast increase in peel strength, the substrates bonded with the control polyesteramide had a tendency to unzip readily while those bonded with the modified polyesteramides had little or no tendency to unzip. In fact the Mylar bonded with the modified polyesteramides was found to tear before unzipping when pulled rapidly while the control bonded Mylar unzipped easily.

EXAMPLE II

Part A.—Control

Example I, Part A, was repeated except that 34 g. monoethanolamine and 280 g. polymeric fat acids (dimeric fat acid content—approximately 90%) were employed. The polymeric fat acids were not hydrogenated but were distilled and were prepared from the mixture of acids derived from tall oil. The resulting polyesteramide had the following properties:

Acid No. _____ .64
Hydroxyl No. _____ 22.5
Gardner viscosity (50% by weight solution in toluene) _____ J–K

Part B.—Modification

One hundred grams of the polyesteramide prepared in Part A was heated to 160° C. and 20 g. of an isocyanate derived from dimerized fat acids was added thereto. The diisocyanate had the formula:

OCNH$_2$C—D—CH$_2$NCO where D is the dimeric fat radical of a dimerized fat acid consisting essentially of dimerized linoleic and oleic acids (the dimerized acids were prepared by polymerizing the mixture of acids derived from tall oil, followed by fractional distillation). The mixture of polyesteramide and isocyanate was heated to 200° C. and held at that temperature for one hour. A 50% solution of the modified polyesteramide was prepared but the same was too viscous to obtain a Gardner viscosity measurement.

Part C.—Comparison of adhesive properties

A 50% by weight solution of the Control polyesteramide of Part A and a 30% by weight solution of the modified polyesteramide of Part B in toluene were used to adhesively bond films of treated, low density polyethylene as in Part D of Example I except that the dry adhesive thickness was 1 mil on the polyethylene substrate. The maximum peel strength of the polyethylene sheets bonded with the Control was 568 g./in. and with the Modification was 1203 g./in.

EXAMPLE III

Part A.—Control

Example II, Part A was repeated except that 64.5 g. monoethaolamine and 560 g. of the polymeric fat acids (dimeric fat acid content—72.9%; monomer content—12.1%; trimer content—15%) were employed. The resulting polyesteramide had the following properties:

Acid No. _____ 1.25
Hydroxyl No. _____ 19.15
Gardner viscosity (50% by weight solution in toluene) _____ R–S

Part B.—Modification 1

Fifty grams of the polyesteramide prepared in Part A were mixed with 0.75 g. toluene diisocyanate (mixture of about 80% 2,4- and 20% 2,6-toluene diisocynate) and heated to 150° C. for three hours. A 50% by weight solution of the resulting modified polyesteramide in toluene was prepared, said solution having a Gardner viscosity of Z$_2$.

Part C.—Modification 2

Part B was repeated except that 2.0 g. of the isocyanate derived from dimerized fat acids as used in Part B of Example II was employed in place of the toluene diisocyanate. The resulting toluene solution of the modified polyesteramide had a Gardner viscosity of Y.

Part D.—Comparison of adhesive properties

The adhesive properties for bonding sheets of treated polypropylene and Mylar were tested using 50% by weight toluene solutions of the Control, Modification 1 and Modification 2 by the procedure described in Part D of Example I. Results of these tests are set forth in the following Table 2.

TABLE 2

| Adhesive | Peel Strength (g./in.) Substrate | |
|---|---|---|
| | Polypropylene | Mylar |
| Control [1] | 70 | 355 |
| Modification 1 [1] | 1,000 | 725 |
| Modification 2 [1] | 700 | 570 |
| Control [2] | 410 | 345 |
| Modification 1 [2] | 2,090 | 1,040 |
| Modification 2 [2] | 1,225 | 1,225 |
| Control [3] | 660 | 500 |
| Modification 1 [3] | 2,225 | 1,360 |
| Modification 2 [3] | 1,225 | 1,315 |
| Control [4] | | 30 |
| Modification 1 [4] | | 590 |
| Modification 2 [4] | | 520 |
| Control [5] | | 225 |
| Modification 1 [5] | | 1,180 |
| Modification 2 [5] | | 1,040 |
| Control [6] | | 470 |
| Modification 1 [6] | | 1,225 |
| Modification 2 [6] | | 1,135 |

[1] Sheets pulled apart at rate of 2 in./min.
[2] Sheets pulled apart at rate of 12 in./min.
[3] Sheets pulled apart at rate of 20 in./min.
[4] Bonded sheets heated in an oven at 150° for five minutes, cooled and then pulled apart at rate of 2 in./min.
[5] Same as (4) except sheets pulled apart at rate of 12 in./min.
[6] Same as (4) except sheets pulled apart at rate of 20 in./min.

Part E.—Comparison of adhesive properties

Part D was repeated except that the substrate was untreated polypropylene film and the bonded films were heated in an oven at 110° C. for three minutes. At a rate of stress of 12 in./min., the Control gave a peel strength of 360 g./in., Modification 1 gave 1660 g./in. and Modification 2 gave 1300 g./in. There was some tendency for the films bonded with the modified polyesteramides to unzip on rapid pulling but such tendency was less than for the control polyesteramide and the adhesion was much higher for the modifications.

EXAMPLE IV

Part A.—Control

Forty pounds of the same polymeric fat acids as employed in Example III and 4.2 pounds of monoethanolamine were added to a ten gallon stirred kettle. The temperature in the kettle was raised to 240° C. over a period of three hours, venting steam at 20 p.s.i. After reaching 240° C., the kettle was evacuated and the pressure reduced to about 5 mm. Hg in about one hour. The reaction mixture was held at this pressure and 240° C. for three more hours. The polyesteramide product had the following properties:

Acid No. _____ 9.4
Hydroxyl No. _____ 9.0
Gardner viscosity (50% by weight solution in toluene) _____ Y–Z Bakelite resin CKR–0036 in an amount of .886 g. was blended into the hot polyesteramide and the same was then cooled to about 150° C. and dumped into smaller containers for further cooling. The Bakelite resin is a phenolic resin available from Union Carbide and is used as an antioxidant.

Part B.—Modification 1

To 101.2 g. of the polyesteramide of Part A was added an equal quantity of toluene and then the resulting solution was heated to reflux. A solution of 1.6 g. Nacconate 80 (a mixture of 80% 2,4-toluene diisocyanate and 20% 2,6-toluene diisocyanate) in 50 cc. of toluene was added to the refluxing polyesteramide solution over a period of 15 minutes. Refluxing was continued for an additional 30 minutes and then the toluene was removed—initially at atmospheric pressure and finally by heating the reaction mixture to 215° C. under water pump vacuum. A 50% by weight solution of the modified polyesteramide in toluene had a Gardner viscosity of $Z_4$.

Part C.—Modification 2

Part B was repeated except that 5.0 g. of the isocyanate derived from dimerized fat acids as used in Part B of Example II was employed in place of the Nacconate 80. A 50% by weight solution of the resulting modified polyesteramide had a Gardner viscosity of $Z_2$–$Z_3$.

Part D.—Comparison of adhesive properties

The adhesive properties for bonding sheets of treated, low density polyethylene and Mylar were tested using 50% by weight toluene solutions of the Control, Modification 1 and Modification 2 by the procedure described in Part D of Example I. However, the dry adhesive thickness was one mil instead of .75 mil. Results of these tests are set forth in the following Table 3.

TABLE 3

| Adhesive | Peel Strength (g./in.) Substrate | |
|---|---|---|
| | Polyethylene | Mylar |
| Control | 640 | 510 |
| Modification 1 | 1,150 | 1,000 |
| Modification 2 | 1,360 | |

EXAMPLE V

Part A.—Control

Part of Example IV was repeated except that 4.31 pounds of monoethanolamine were employed and the heat up was carried out at atmospheric pressure using a condenser on the kettle held at 95° C. The resulting polyesteramide had the following properties:

Acid No. _____ 4.1
Hydroxyl No. _____ 4.7
Gardner viscosity (50% by weight solution in toluene) _____ $Z_1$–$Z_2$ Part B.—Adhesive properties of control and isocyanate modified polyesteramide A 30% by weight solution of the polyesteramide of Part A in toluene was prepared. A second 30% solution was also prepared but 4% by weight, based on the weight of the polyesteramide, of the isocyanate derived from dimerized fat acids as used in Part B of Example II was added to said solution. This solution will be referred to hereinbelow as the modification. These unheated solutions were applied to films of treated polypropylene and Mylar as in Part D of Example I except that the dry adhesive thickness was .5 mil. The results of these tests are set forth in the following Table 4.

TABLE 4

| Adhesive | Peel Strength (g./in.) Strength | |
|---|---|---|
| | Polypropylene | Mylar |
| Control [1] | 1,000 | 270 |
| Modification 1 [1] | 1,540 | 230 |
| Control [2] | 795 | |
| Control [3] | | 600 |
| Modification 2 [3] | 1,700 | 780 |

[1] Bonded sheets not heated.
[2] Bonded sheets heated in oven at 120° C. for five minutes.
[3] Bonded sheets heated in oven at 150° C. for five minutes.

In this example the modification reaction was effected between the bonded substrate surfaces. Not only did the modified polyesteramide again show increased adhesive properties but the sheets bonded with same had no tendency to unzip whereas those bonded with the control polyesteramide unzipped rather readily when pulled rapidly.

It is to be understood that the invention is not to be limited to the exact details of operation or the exact compositions shown and described, as obvious modifications and equivalents will be apparent to those skilled in the art and the invention is to be limited only by the scope of the appended claims.

The embodiments of the invention in which an exclusive property or privilege is claimed are defined as follows:

1. A modified polyesteramide prepared by reacting 0.5 to 50% by weight of an organic polyisocyanate or polyisothiocyanate with a polyesteramide prepared by reacting (1) polymeric fat acids derived from monobasic aliphatic carboxylic acids having hydrocarbon chains of 8–24 carbon atoms, said polymeric fat acids having a dimeric fat acid content of about 70 to 100% by weight, with about an equivalent amount of (2) an alkanolamine selected from the group consisting of monoethanolamine, 3-aminopropanol-1 and mixtures thereof.

2. The modified polyesteramide of claim 1 wherein the polyisocyanate or polyisothiocyanate is a diisocyanate or diisothiocyanate.

3. The modified polyesteramide of claim 1 wherein the alkanolamine is monoethanolamine.

4. The modified polyesteramide of claim 1 wherein the polymeric fat acids are derived from an acid mixture containing a substantial portion of linoleic acid.

5. An adhesive solution comprising an organic solvent and about 5 to 75% by weight based on the total composition of the modified polyesteramide of claim 1.

6. The adhesive solution of claim 5 wherein the solvent is toluene.

7. In a method of forming a bond between solid materials wherein an adhesive is applied to at least a portion of the surface of a first solid material and then the surface having the adhesive thereon is brought into contact with the surface of a second solid material, the improvement comprising employing as the adhesive the modified polyesteramide of claim 1.

8. The method of claim 7 wherein the modified polyesteramide is employed in the form of a solvent solution thereof.

9. The method of claim 7 wherein pressure is applied to the solid materials after the adhesive is applied and the solid materials are brought into contact.

10. The method of claim 7 wherein the alkanolamine is monoethanolamine, the polymeric fat acids have a dimeric fat acid content of 85 to 100% by weight and the polyisocyanate or polyisothiocyanate is a diisocyanate.

11. The method of claim 7 wherein the solid materials are sheets of polyethylene, sheets of polypropylene or sheets of a polyester resin prepared from terephthalic acid and ethylene glycol.

12. The bonded article prepared by the process of claim 7.

No references cited.

MORRIS LIEBMAN, *Primary Examiner.*

H. H. FLETCHER, *Assistant Examiner.*